June 10, 1958 — A. ALIBERTI — 2,837,796
EJECTOR PIN
Filed April 12, 1955
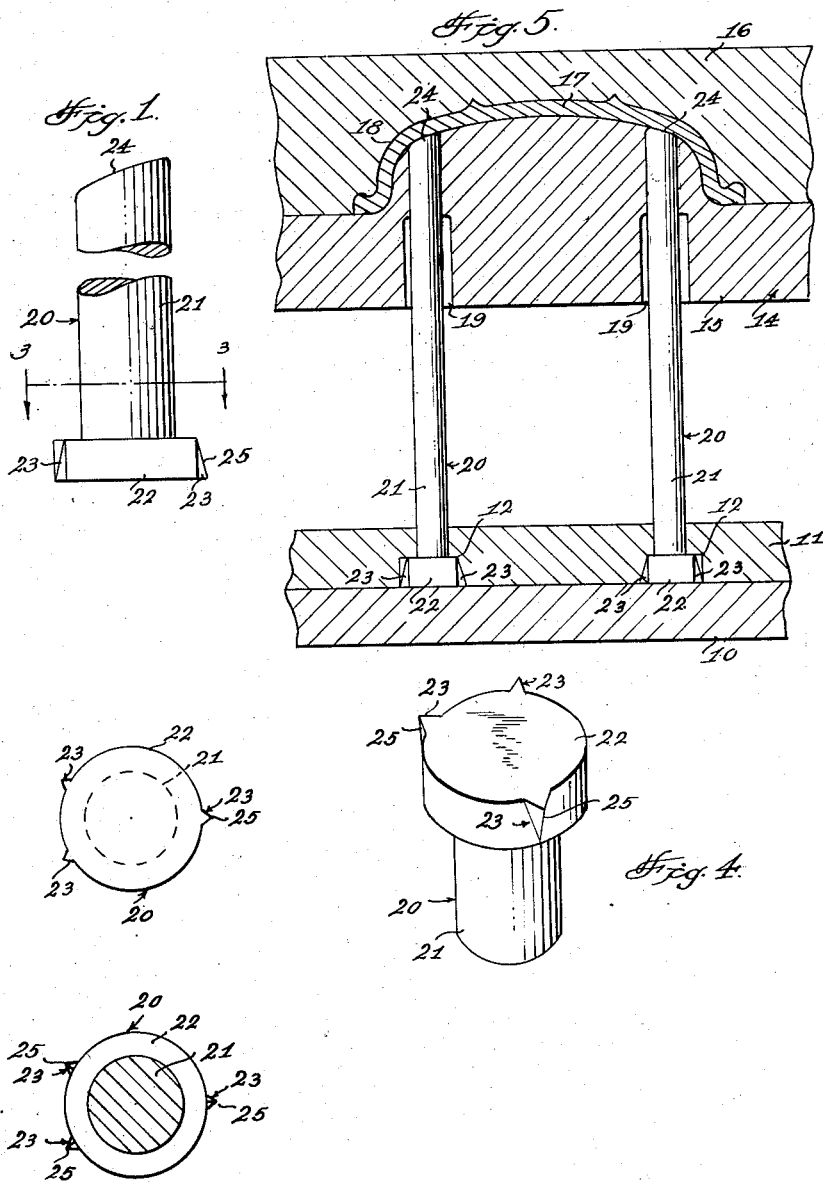
INVENTOR.
ALVINO ALIBERTI
BY Victor J. Evans & Co.
ATTORNEYS

United States Patent Office 2,837,796
Patented June 10, 1958

2,837,796

EJECTOR PIN

Alvino Aliberti, Southbridge, Mass.

Application April 12, 1955, Serial No. 500,782

1 Claim. (Cl. 22—94)

This invention relates to a mold, and more particularly to an ejector pin for a mold.

The object of the invention is to provide an ejector pin which includes a head that is constructed so that accidental rotation of the ejector pin will be prevented.

Another object of the invention is to provide an ejector pin which will facilitate the ejection of the molded or cast products from the core of the mold, the ejector pins being provided with prongs which are oriented for properly aligning the pins in their proper position.

A further object of the invention is to provide an ejector pin which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a side elevational view of one of the ejector pins, with parts broken away and in section.

Figure 2 is an end elevational view of the ejector pin.

Figure 3 is a sectional view taken on the line 3—3 of Figure 1.

Figure 4 is a perspective view of one of the ejector pins.

Figure 5 is a sectional view illustrating the use of the ejector pins, and with parts broken away and in section.

Referring in detail to the drawings, the numeral 10 designates an ejector plate, while the numeral 11 designates a retainer plate, and the retainer plate may be provided with a plurality of countersunk recesses or openings 12, Figure 5. There is further provided the usual core 15 which forms part of a mold 14, and the mold 14 further includes a base 16. The base 16 may be provided with a cavity or recess 18 in which is positioned the molding or casting 17. The core 15 may include a plurality of spaced apart openings 19.

The numeral 20 designates each of the ejector pins, and each of the pins 20 includes a cylindrical shank 21 which extends through the openings 19 in the core 15. Each pin 20 further includes an enlarged cylindrical head 22 that has a plurality of tapered or pointed prongs or teeth 23 extending outwardly therefrom. Two of these prongs 23 may be spaced 60 degrees apart from each other. The prongs 23 may have their outer edges shaped to form a sharp or knife-like edge 25, Figures 1 through 4. The free end of the shank 21 is curved or inclined as at 24 so as to conform to the shape of the molding or casting 17.

From the foregoing it is apparent that there has been provided ejector pins which are especially suitable for use with molds. In use, the parts can be assembled as shown in Figure 5 so that the pins 20 have their heads 22 seated in the recesses 12 in the retainer plate 11, the ejector plate 10 being arranged adjacent the outer surface of the plate 11. The shanks 21 of the pins 20 extend through the openings 19 in the core 15, and the outer ends or free ends of the shanks 21 are inclined as at 24 so as to conform to the shape of the casting or molding 17 which is being produced. Thus, the ejector pins 20 can be used for removing the casting 17 from the core 15 after the base 16 and core 15 have been detached from each other. The pointed or tapered prongs 23 maintain the pins 20 in their proper aligned position since these prongs 23 bite or dig into the adjacent surfaces of the plate 11 to prevent accidental rotation of the pins 20. Since the pins 20 will not accidentally rotate, then the inclined or curved surfaces 24 will not move from their proper aligned position with respect to the casting 17. Thus, the surfaces 24 must be in a definite position with respect to the casting 17, depending upon the curvature or shape of the casting 17.

Thus, the prongs 23 prevent accidental rotation of the pins 20 so as to prevent damage to the parts being molded. Two of the prongs 23 may be spaced 60 degrees apart as shown in Figure 2. Each of the prongs may extend outwardly from the head approximately $1/32$ to $3/64$ of an inch and the shank 21 may have a diameter of $1/16$ to $3/4$ of an inch.

The pins 20 thus serve to eject the molded or cast product 17 off of the core 15 of the mold. Since two of the prongs 23 are spaced 60 degrees apart, once the pins are installed in the retainer plate 11, they may be taken out and put back in place and still be oriented in their proper position. The retainer plate 11 may be drilled and bored to fit the heads of the ejector pins and these bores may be about .005 inch larger than the diameter of the pin head. Then, to install the pin it is only necessary to set it in place and strike it with a hammer.

The head of the pin is hardened to R/C .40 so that the prongs imbed into the retainer plate 11. The opposite end of the pin, which is the working end, is hardened to R/C .25 and nitrided. The main purpose of the pin is to insure that the working end forms part of the molding or casting so that when irregular shapes are being cast, the pin will not turn, otherwise the casting would be irregular.

I claim:

In combination, an ejector plate, a retainer plate arranged contiguous to said ejector plate and provided with a plurality of countersunk recesses, a mold including a coacting core and a base, there being a cavity in said base for receiving a casting or molding, said core being provided with an enlarged portion extending into said casting, there being a plurality of spaced apart openings in said core, a plurality of spaced parallel similar ejector pins each including an enlarged head seated in said recess, said ejector pins adapted to be used for removing the casting from the core after the base and core have been detached from each other, each of said heads having a cylindrical shape, a plurality of prongs extending outwardly from said head and engaging said retainer plate to prevent accidental rotation of the pins, a cylindrical shank extending from each of said heads and projecting through the openings in said core and engaging said casting, the diameter of said heads being greater than the diameter of said shanks, the free edge of each of said shanks being inclined to fit the corresponding contour of the casting, the inclined surface being maintained in its proper aligned position with respect to the casting since the pins will not accidentally rotate so that the inclined surface will be in a definite fixed position with respect to the casting, said prongs having their outer ends sharpened to form a knife edge, said heads each including an outer flat surface, said prongs being of maximum size in cross section at a point contiguous to said flat surface, said prongs decreasing progressively in size in proportion to the distance away from the flat surface so that the knife edge gradually merges into the head, two of said prongs being spaced 60 degrees apart from each other whereby once the pins are installed in the retainer plate, the pins may be taken out and put back in place and still be oriented in their proper position.

References Cited in the file of this patent

UNITED STATES PATENTS

| | | |
|---|---|---|
| 807,024 | Grimes et al. | Dec. 12, 1905 |
| 988,564 | Garred | Apr. 4, 1911 |
| 1,290,614 | McFarland | Jan. 7, 1919 |
| 1,318,404 | Penn | Oct. 14, 1919 |
| 1,394,246 | Bolling | Oct. 18, 1921 |
| 1,611,869 | Anderson | Dec. 28, 1926 |
| 2,272,718 | MacLagan et al. | Feb. 10, 1942 |
| 2,302,367 | Ericson | Nov. 17, 1942 |
| 2,446,174 | Flynt | Aug. 3, 1948 |
| 2,467,246 | Winkel | Apr. 12, 1949 |
| 2,483,093 | Harvey | Sept. 27, 1949 |
| 2,490,229 | Quarnstrom | Dec. 6, 1949 |
| 2,631,488 | Tansey | Mar. 17, 1953 |
| 2,645,815 | Quarnstrom | July 21, 1953 |
| 2,757,594 | Tanke | Aug. 7, 1956 |
| 2,800,693 | Kusnery | July 30, 1957 |

FOREIGN PATENTS

| | | |
|---|---|---|
| 834,050 | Germany | Mar. 17, 1952 |